United States Patent
Adams et al.

(10) Patent No.: US 10,318,950 B2
(45) Date of Patent: Jun. 11, 2019

(54) MOBILE COMMUNICATIONS DEVICE PROVIDING NEAR FIELD COMMUNICATION (NFC) SECURITY FEATURES AND RELATED METHODS

(75) Inventors: Neil Patrick Adams, Waterloo (CA); Ravi Singh, Toronto (CA); Vincenzo Kazimierz Marcovecchio, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1140 days.

(21) Appl. No.: 13/339,863

(22) Filed: Dec. 29, 2011

(65) Prior Publication Data

US 2013/0173455 A1 Jul. 4, 2013

(51) Int. Cl.
| | | |
|---|---|---|
| G06Q 40/00 | (2012.01) | |
| G06Q 20/32 | (2012.01) | |
| H04B 5/00 | (2006.01) | |
| H04W 4/80 | (2018.01) | |
| H04W 12/08 | (2009.01) | |

(52) U.S. Cl.
CPC ......... *G06Q 20/3278* (2013.01); *G06Q 40/00* (2013.01); *H04B 5/00* (2013.01); *H04W 4/80* (2018.02); *H04W 12/08* (2013.01)

(58) Field of Classification Search
CPC ........ G06Q 20/32; G06Q 20/40; G06Q 20/20; G06Q 20/204; G06Q 20/322; G06Q 20/3278; G06Q 40/00
USPC ...................... 705/39, 44; 235/375, 451, 492
See application file for complete search history.

(56) References Cited

U.S. PATENT DOCUMENTS

| | | | |
|---|---|---|---|
| 5,717,688 A * | 2/1998 | Belanger et al. ............. 370/331 | |
| 2007/0099679 A1 | 5/2007 | Saarisalo | |
| 2007/0235539 A1 | 10/2007 | Sevanto et al. ............... 235/451 |
| 2008/0167000 A1 | 7/2008 | Wentker et al. .............. 455/408 |
| 2009/0102712 A1 | 4/2009 | Heffez | |
| 2010/0190470 A1* | 7/2010 | Raleigh ......................... 455/406 |
| 2010/0217709 A1 | 8/2010 | Aabye et al. ................... 705/44 |
| 2010/0306107 A1 | 12/2010 | Nahari ............................. 705/44 |

(Continued)

FOREIGN PATENT DOCUMENTS

| | | |
|---|---|---|
| CA | 2775189 | 3/2011 |
| WO | 2006100171 | 9/2006 |

(Continued)

OTHER PUBLICATIONS

Jovanovic et al."Analysis of the Latest Trends in Movile Commerce Using the NFC Technology" May 2011, Journal of Selected Areas in Telecommunications, pp. 1-12.*

(Continued)

*Primary Examiner* — Kelly S Campen
(74) *Attorney, Agent, or Firm* — Guntin & Gust, PLC; Douglas Schnabel

(57) ABSTRACT

A mobile communications device includes a near field communication (NFC) device, a movement determining device, and a processor coupled with the NFC device and the movement determining device. The processor performs operations for selectively switching between a first operating mode, in which the NFC device is enabled for NFC communication, and a second operating mode. When switched to the unsecure operating mode, the processor performs operations for enabling the NFC device for NFC communication until the mobile communications device moves beyond a threshold distance based upon the movement determining device.

21 Claims, 6 Drawing Sheets

(56) References Cited

U.S. PATENT DOCUMENTS

| | | |
|---|---|---|
| 2011/0021175 A1 | 1/2011 | Florek et al. ................. 455/410 |
| 2011/0092185 A1 | 4/2011 | Garskof |
| 2012/0202485 A1* | 8/2012 | Mirbaha et al. ........... 455/426.1 |

FOREIGN PATENT DOCUMENTS

| | | |
|---|---|---|
| WO | 2010006791 | 1/2010 |
| WO | 2011088654 | 7/2011 |

OTHER PUBLICATIONS

Lamarca et al "Pervasive Computing" May 2007, Lecture Notes in Computer Science, 4480.*
European Patent Office, "Office Action", for EP Application No. 11196108.2, dated May 7, 2017, 4 pages.

* cited by examiner

# MOBILE COMMUNICATIONS DEVICE PROVIDING NEAR FIELD COMMUNICATION (NFC) SECURITY FEATURES AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (FDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

DETAILED DESCRIPTION

Figure 1:
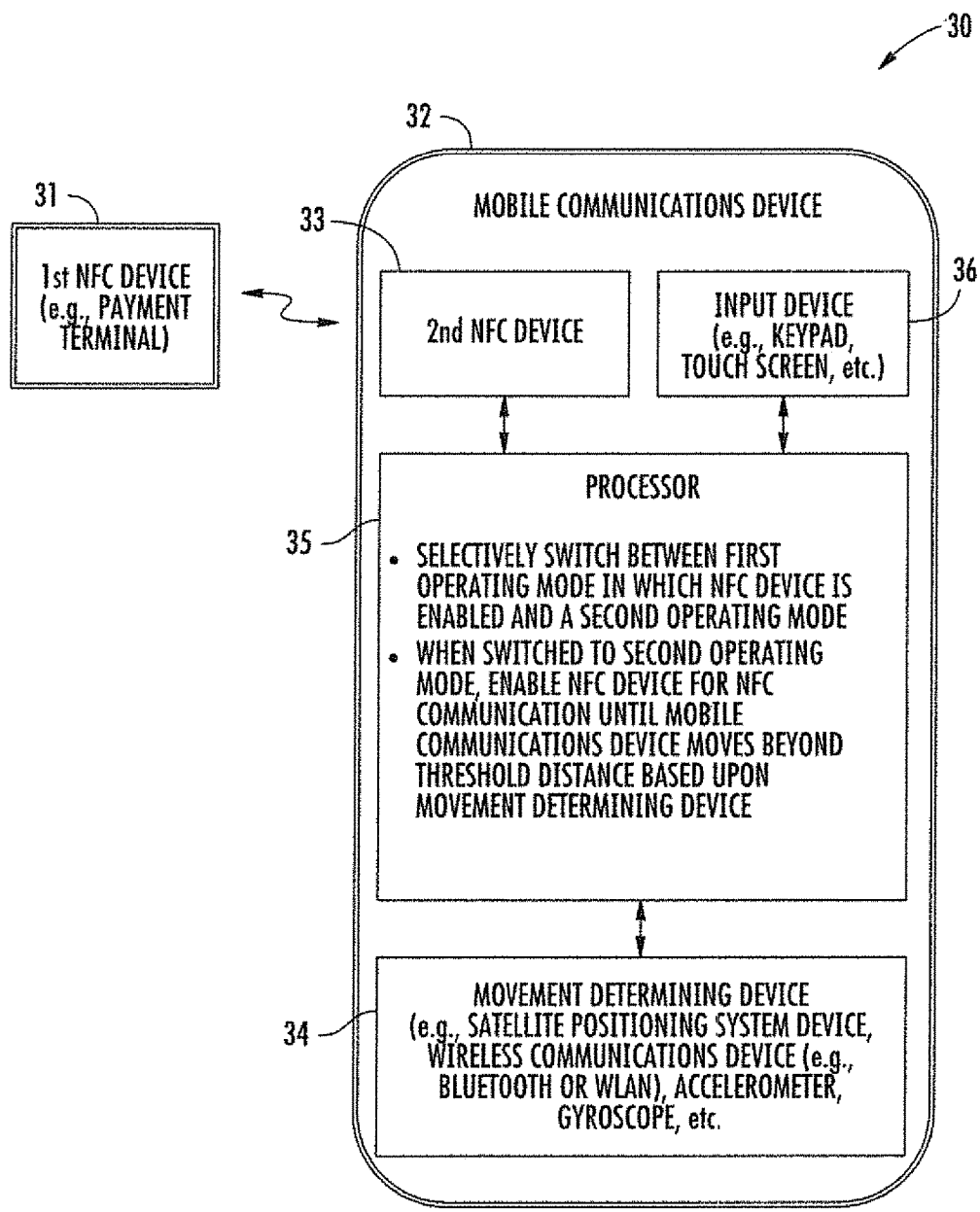
FIG. 1 is a schematic block diagram of a communications system in accordance with an example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a near field communication (NFC) device, a movement determining device, and a processor coupled with the NFC device and the movement determining device. The processor may be capable of selectively switching between a first operating mode in which the NFC device is enabled for NFC communication and an second operating mode, and when switched to the second operating mode, enabling the NFC device for NFC communication until the mobile communications device moves beyond a threshold distance based upon the movement determining device. Accordingly, when in the second operating mode, NFC communication may advantageously be disabled to help prevent unauthorized NFC communications or transactions in the event the mobile device is stolen, etc.

The processor, when switched to the second operating mode, may be further capable of enabling the NFC device for NFC communication until a number of NFC transactions are performed via the NFC device. Moreover, when switched to the second operating mode, the processor may be further capable of enabling the NFC device for NFC communication until a duration from a time of switching to the second operating mode elapses. Furthermore, the processor may be capable of performing payment transactions via the NFC device, and the processor, when switched to the second operating mode, may be further capable of enabling the NFC device for NFC communication until a payment amount associated with at least one payment transaction performed while in the second operating mode exceeds a payment threshold.

By way of example, the movement determining device may comprise a satellite positioning system device, or a wireless communications device, such as a Bluetooth device or a wireless local area network (WLAN) device. In accordance with another example, the movement determining device may comprise an accelerometer. The mobile communications device may further comprise at least one input device coupled with the processor, and the processor may be capable of selectively switching between the secure operating mode and the second operating mode based upon the at least one input device.

A related communications system and a related communications method for a mobile communications device, such as the one described briefly above, are also provided. The method may include selectively switching the mobile wireless communications device between a first operating mode in which the NFC device is enabled for NFC communication and an second operating mode and, when switched to the second operating mode, enabling the NFC device for NFC communication until the mobile communications device moves beyond a threshold distance based upon the movement determining device.

A related non-transitory computer-readable medium is for a mobile communications device, such as the one described briefly above. The computer-readable medium may have computer-executable instructions for causing the mobile wireless communications device to perform steps including selectively switching the mobile wireless communications device between a first operating mode in which the NFC device is enabled for NFC communication and an second operating mode and, when switched to the second operating mode, enabling the NFC device for NFC communication until the mobile communications device moves beyond a threshold distance based upon the movement determining device.

Referring initially to FIG. 1, a communications system 30 and related method aspects are first described. The system 30 illustratively includes a first NFC device 31 and a mobile communications device 32 (also referred to as a "mobile device" herein). The mobile device 32 illustratively includes a second NFC device 33, a movement determining device 34, and a processor 35 coupled with the second NFC device and the movement determining device. By way of example, the first NFC device 31 may be incorporated in or associated with a payment terminal (e.g., a point of sale terminal), a security terminal (e.g., a physical access terminal), etc. Example mobile devices 32 may include portable or personal media players (e.g., music or MP3 players, video players, etc.), portable gaming devices, portable or mobile telephones, smartphones, tablet computers, digital cameras, etc. The processor 35 may be implemented using suitable hardware (e.g., a microprocessor, NFC control circuitry, etc.) and a non-transitory computer-readable medium with computer-executable instructions configured to perform the various operations described herein, for example. By way of example, a mobile wallet may be implemented on the mobile device 32 (e.g., by storing secure applications on a secure element) for causing the first NFC device 31 to initiate or perform the various payment or security operations.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Figure 2:
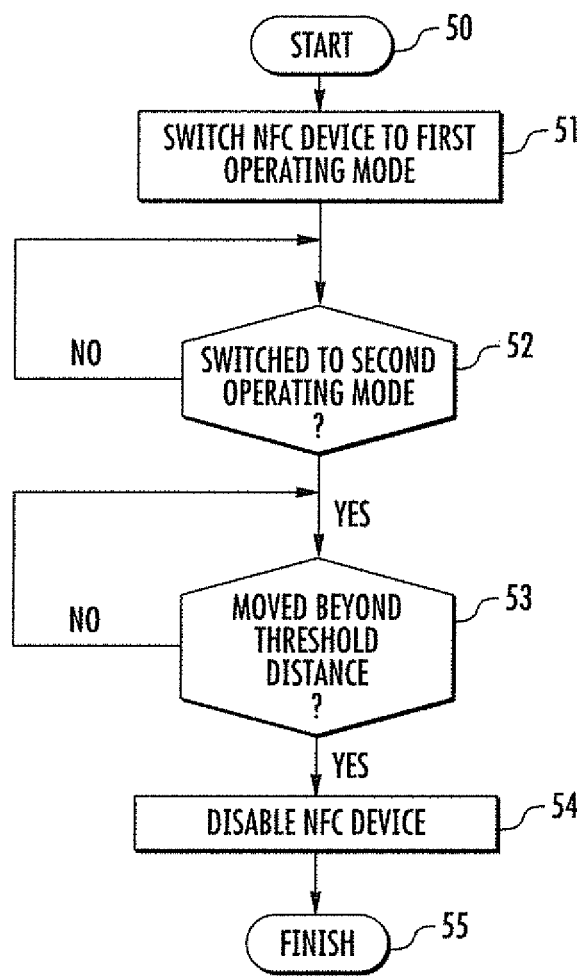
FIGS. 2 and 3 are flow diagrams illustrating method aspects associated with the system of FIG. 1.

Referring additionally to FIG. 2, beginning at Block 50, the processor 35 may be configured to selectively switch between a first operating mode in which the second NFC device 33 is enabled for NFC communication, and an second operating mode, at Blocks 51-52. Generally speaking, the first operating mode may be considered a "secure" operating mode and may be appropriate when the mobile device 32 is within the physical possession of its owner or authorized user. That is, when a mobile device 32 is in the hands of its owner, then it is generally safe to keep the NFC device 33 enabled for NFC communication so that it may readily perform or initiate the requisite payment or security operations.

On the other hand, there may be occasions where, in order to complete a desired NFC transaction (e.g., a payment transaction), the user is required to hand over the mobile device 32 to another person who is otherwise not known to or trusted by the mobile device owner. For example, some drive-through restaurants have outdoor NFC payment terminals to pay for their orders. Yet, if the outdoor payment terminal is not working for some reason, the user may be required to physically hand the mobile device 32 over to the drive-through attendant to swipe the mobile device with another NFC payment terminal inside the restaurant. Similarly, if a NFC payment terminal at a counter within the restaurant is not operational, then the mobile device 32 may need to be handed over to an employee behind the counter to communicate with a different NFC payment terminal. The problem of having to hand over the mobile device 32 may occur in other contexts as well, such as to provide security credentials at a guard station, etc.

Yet, handing over the mobile device 32 to an unknown employee, attendant, teller, etc., may be problematic. This may be particularly so where the mobile device 32 is a multi-use device, such as a PDA or smart phone, which may include other sensitive or personal information (e.g., contacts, emails, pictures, videos, etc.). Beyond potential compromise of such data, another particular concern is that once the mobile device 32 is taken from the user's control or possession, it may be used for making extra purchases, or making a purchase of an unauthorized amount, for example.

Switching the processor 35 to the second or unsecure operating mode may advantageously help avoid unauthorized uses of the mobile device 32 when it is out of the user's possession. That is, when in the unsecure operating mode, the processor 35 enables the second NFC device 33 for NFC communication until the mobile communications device 32 moves beyond a threshold distance based upon the movement determining device 34, at Block 53, at which point the NFC device is disabled from further NFC communication or performing further transactions, at Block 54, which concludes the method illustrated in FIG. 2 (Block 55).

It should be noted that when in the first operating mode, the processor 35 may enable the second NFC device 33 for communication without the second NFC device being powered on or in an active mode. That is, the processor 35 may be in the secure operating mode (e.g., within the possession of its owner or user), yet still enable the second NFC device 33 for communication when necessary but allow the second NFC device to remain in a power off or low power tag detect state in the interim, for example. Additionally, the second NFC device 33 may be capable of passive mode operation in some embodiments, yet still be enabled for communication by the processor 35 when activated by a field from the first NFC device 31. Thus, as used herein, "enabled" for communication does not necessarily require that the second NFC device be in a powered or active state.

In one example embodiment the movement determining device 34 may comprise a satellite positioning system device, such as a global positioning system (GPS), GLONASS, Galileo, or other similar global navigation device. Thus, when switched to the unsecure operating mode, the processor 35 may cooperate with the movement determining device 34 to determine an initial location (e.g., latitude and longitude coordinates) of the mobile device 32 and thereafter determine subsequent locations and a distance traveled from the initial location. The initial location may be the location where the mobile device 32 was when the processor 35 switched to the unsecure operating mode, a last known location (e.g., the last position measurement taken before the mobile device 32 was taken inside a building where satellite positioning signals are no longer available), or a next determined location (e.g., when the mobile device 32 exits a building in which the processor 35 was switched to the unsecure operating mode and satellite positioning signals are re-acquired).

Accordingly, the processor 35 may thereby determine when the mobile device 32 has been moved over a threshold distance away from the initial location, which may be considered as a theft or unauthorized taking of the mobile device, resulting in the processor disabling or otherwise preventing NFC transactions from being performed via the second NFC device 33. It may be advantageous to disable the second NFC device 33 at a radio frequency (RF) or hardware level, as this may prevent the second NFC device from being reset via a battery pull, for example, to circumvent the unsecure operating mode, although other suitable approaches for disabling the second NFC device may also be used.

In accordance with another example embodiment, the movement determining device 34 may comprise a wireless communications device, such as a Bluetooth transceiver or a wireless local area network (WLAN) transceiver. For example, the mobile device 32 may be a Bluetooth-enabled mobile device that is linked or paired with a Bluetooth headset, and when the mobile device and headset are out of Bluetooth communication range (or they experience a given degradation in signal strength), then the mobile device may be considered to have moved beyond an acceptable threshold distance, making disabling of the second NFC device 33 appropriate. In the case of a WLAN device, if the mobile device 32 is in a WLAN coverage area when the processor 35 is switched to the unsecure operating mode, then the mobile device may be considered to have traveled beyond the threshold distance when it goes outside of the WLAN coverage area (or the WLAN signal strength degrades past a certain level), for example.

Still another example embodiment is that the movement determining device 34 may comprise at least one of an accelerometer or a gyroscope. Such devices may be used to determine when the mobile device 32 is in motion or traveling, and a given amount of determined motion may be considered as moving the mobile device 32 beyond the movement threshold, for example.

Figure 3:
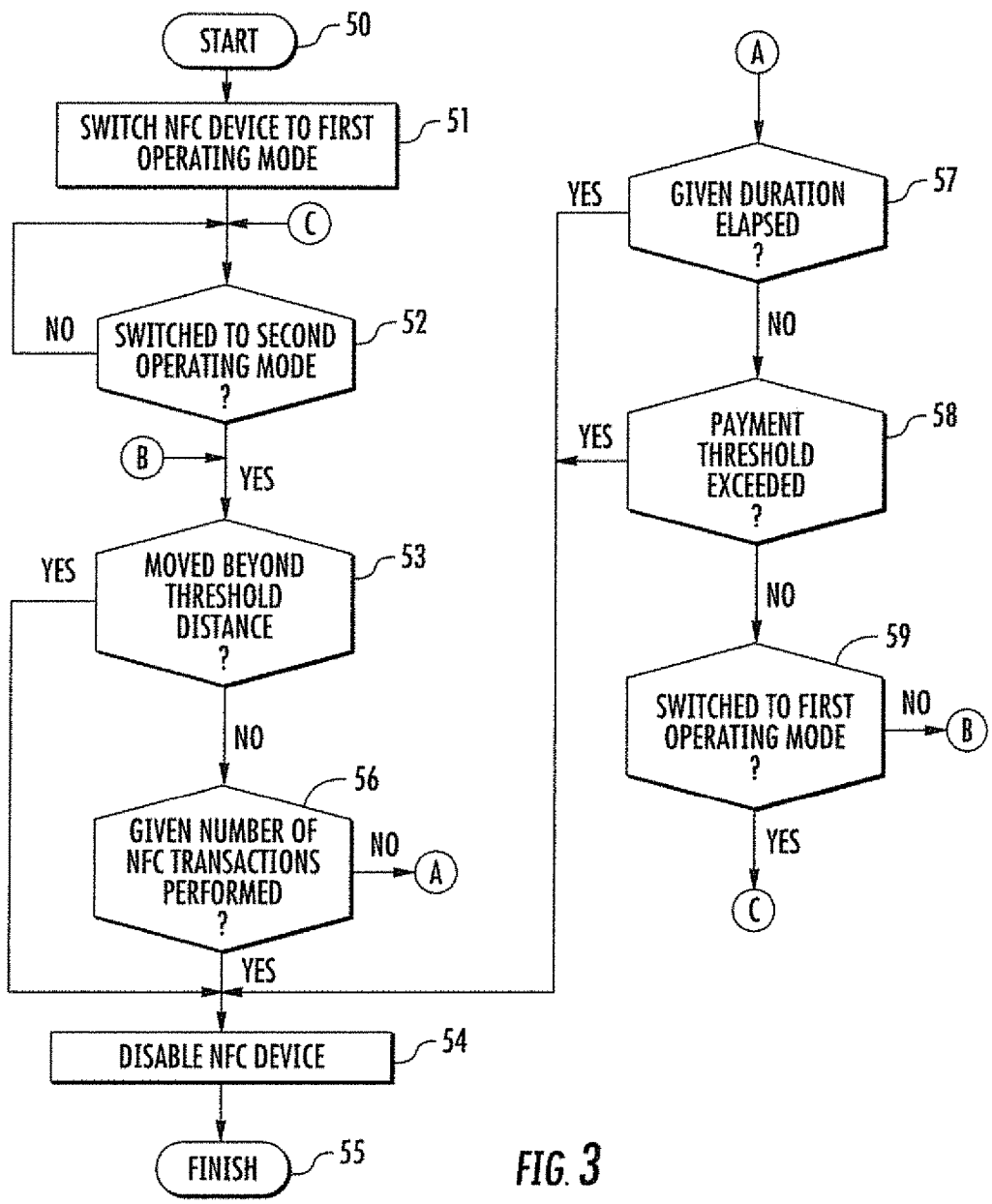

Referring additionally to FIG. 3, other triggering events besides distance may be used to determine when disabling of the NFC device 31 is appropriate in the unsecure operating mode. For example, when switched to the unsecure operating mode, the processor 35 may be further configured to enable the second NFC device 33 for NFC communication until a number of NFC transactions are performed via the second NFC device, at Blocks 54 and 56. For example, if a designated or given number of transactions are performed, then the processor 35 may disable the second NFC device 33 so that no further NFC transactions may be performed.

Another example triggering event may comprise an elapsed duration from a time of switching to the unsecure operating mode, at Block 57. For example, if the processor 35 is not returned to the secure operating mode (Block 59) within a given time, then the second NFC device 33 may be disabled. By way of example, the processor 35 may be switched between the secure operating mode and the unsecure operating mode based upon input provided via one or more input devices 36 (e.g., a keypad, touch screen, convenience key, etc.). In some instances, this may include entering a password, such as to return the processor 35 to the secure operating mode after it has been placed in the unsecure operating mode.

Still another example triggering event may be used in the case where the processor 35 is configured to perform payment transactions via the second NFC device 33. More particularly, the processor 35, when switched to the unsecure operating mode, may be further configured to enable the second NFC device 33 for NFC communication until a payment amount associated with at least one financial transaction performed while in the unsecure operating mode exceeds a payment threshold, at Block 58. Thus, for example, if the amount of money charged for a given payment transaction (or an accumulation of charges for multiple transactions) exceeds the payment threshold, then the second NFC device 33 may be disabled.

In addition, the mobile device 32 may optionally be locked or prevented from performing non-NFC operations when the processor 35 is in the unsecure operating mode. That is, other operations such as placing a telephone call, viewing contacts or emails, etc., may be prohibited by the processor 35 so that this information may be protected or kept private from the person to whom the mobile device 32 has been entrusted. As noted above, once the mobile device 32 is returned to the user, the processor 35 may be returned to the secure operating mode (e.g., by entering a password, biometric, etc.), to thereby once again allow telephone calls, viewing of contacts or emails, etc.

In accordance with another advantageous aspect, the processor 35 may also optionally be configured to perform a wipe of the mobile device 32 if the processor is not returned to the secure operating mode within a set period or time. That is, emails, contacts, call logs, applications, etc., may be wiped or deleted from memory by the processor 35 if the mobile device 32 is not returned to the secure operating mode within the set period of time to help prevent unauthorized access of this information.

Figure 4:
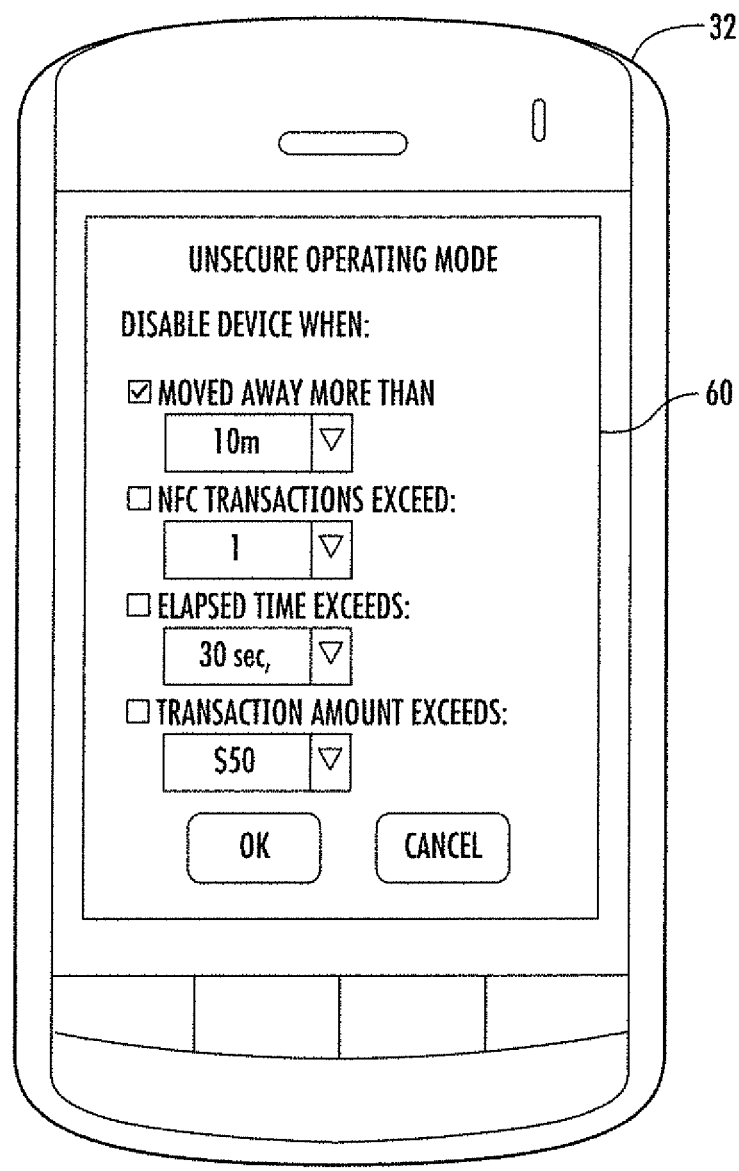
FIGS. 4 and 5 are front views of an embodiment of the mobile communications device of the system of FIG. 1 illustrating unsecure operating mode security features.

The foregoing will be further understood in the context of an example now described with reference to FIGS. 4 and 5. In the example, the mobile device 32 includes a display 60. The processor 35 may be prompted to switch to the unsecure operating mode at a time when it is required to hand off the mobile device 32 to perform an NFC transaction (e.g., to an employee at a drive-through restaurant, etc.), as described above. This may be done via a convenience key, an on-screen menu, etc. Once prompted, the processor 35 cooperates with the display 60 to display an options or confirmation screen, in which various configuration options for the unsecure operating mode are provided. Here, the options include the ability to select which of the above-described triggering event or events will be used by the processor 35 to determine when the second NFC device 33 is to be disabled once the unsecure operating mode is entered, including: a threshold distance the mobile device may be moved; a maximum number of NFC transactions to be permitted; how long the second NFC device may remain enabled for NFC communication once the unsecure operating mode is entered or initiated; or a maximum cost or transaction limit.

In the illustrated example, the threshold distance is set to 10 m, the transaction number limit is set to one, the time limit is set to 30 seconds, and the transaction limit is set to $50, although other values may be used (drop down menu boxes are provided on the display 60 in the example embodiment for changing these options). Moreover, in the example embodiment, check boxes are provided to select which of the triggering events to use when in the unsecure operating mode, although other suitable input features (e.g., check boxes, highlighting, etc.) may also be used. That is, one or more of the triggering events may be selected, and in the current example the only selected triggering event is the use of movement beyond the threshold distance. Once the user makes the appropriate selections, selecting an "OK" option causes the processor 35 to switch to the unsecure operating mode. A "cancel" selection may instead be made to exit the options screen, in which case the processor 35 will not enter the unsecure operating mode. Not all of the above-noted triggering events need to be provided as options in all embodiments.

It should be noted that other option screen configurations may be used, and that in some embodiments an options screen need not be used to cause the processor 35 to enter the unsecure operating mode. For example, an options screen, similar to the one shown in FIG. 4, may be initially used to set default or preferred options for the unsecure operating mode (or the default settings may be set by a device manufacturer, a trusted service manager (TSM), etc.), and only a convenience key, a menu item or icon selection, a defined pattern of movement detected by the movement determining device 34, etc., may be required to relatively quickly initiate the unsecure operating mode. Moreover, in some embodiments, the processor 35 may be configured to automatically switch to the unsecure operating mode, such as based upon a location of the mobile device 32, an NFC transaction history, etc.

Figure 5:
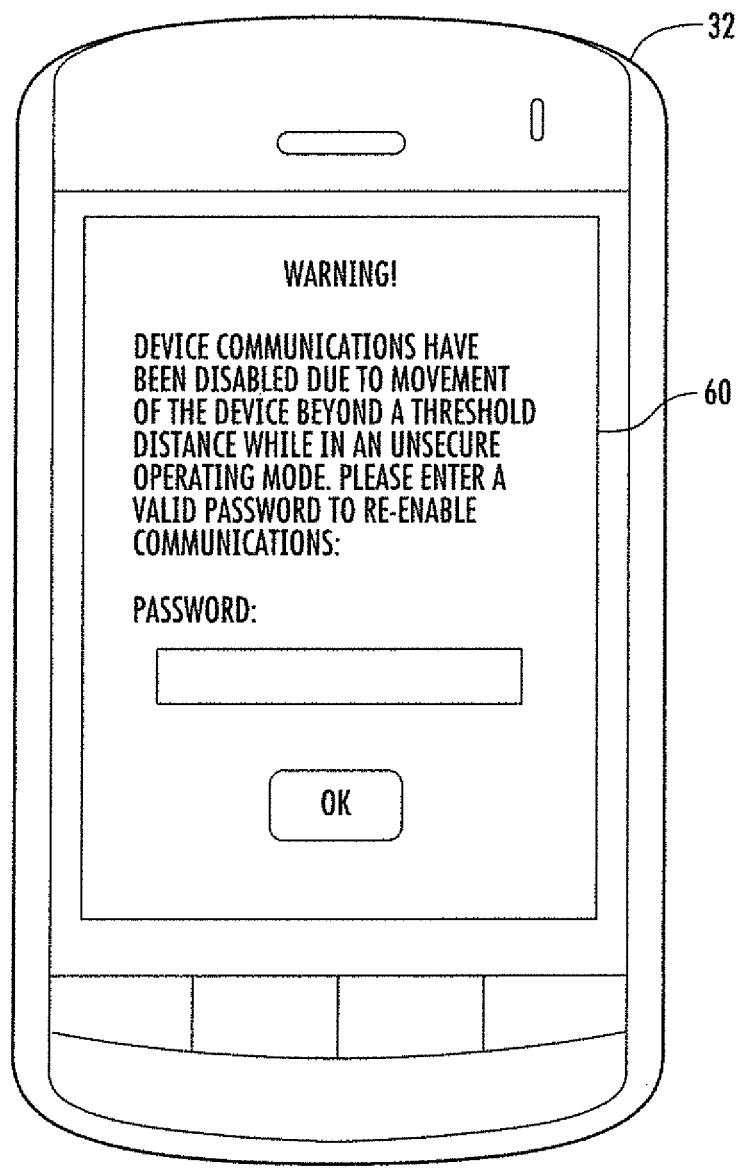

Once a triggering event occurs which causes the processor 35 to disable the second NFC device 33 when in the unsecure operating mode, the processor 35 may cooperate with the display 60 to display a message screen providing a notification that NFC communications (or, more generally, operation of the mobile device 32) has been disabled until the processor 35 switches back to the secure operating mode (FIG. 5). Switching back to the secure operating mode may be done based upon entering a valid password, as shown.

The above-described approach therefore advantageously helps prevent unauthorized NFC transactions when the mobile device 32 is out of the physical possession of an owner or authorized user. Moreover, it may also advantageously be used to help prevent the theft or loss of other sensitive data (which may or may not be related to NFC transactions) stored on the mobile device 32. Thus, this may advantageously provide a greater comfort level with performing NFC transactions where passing the mobile device 32 to another is required.

Example components of a mobile communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
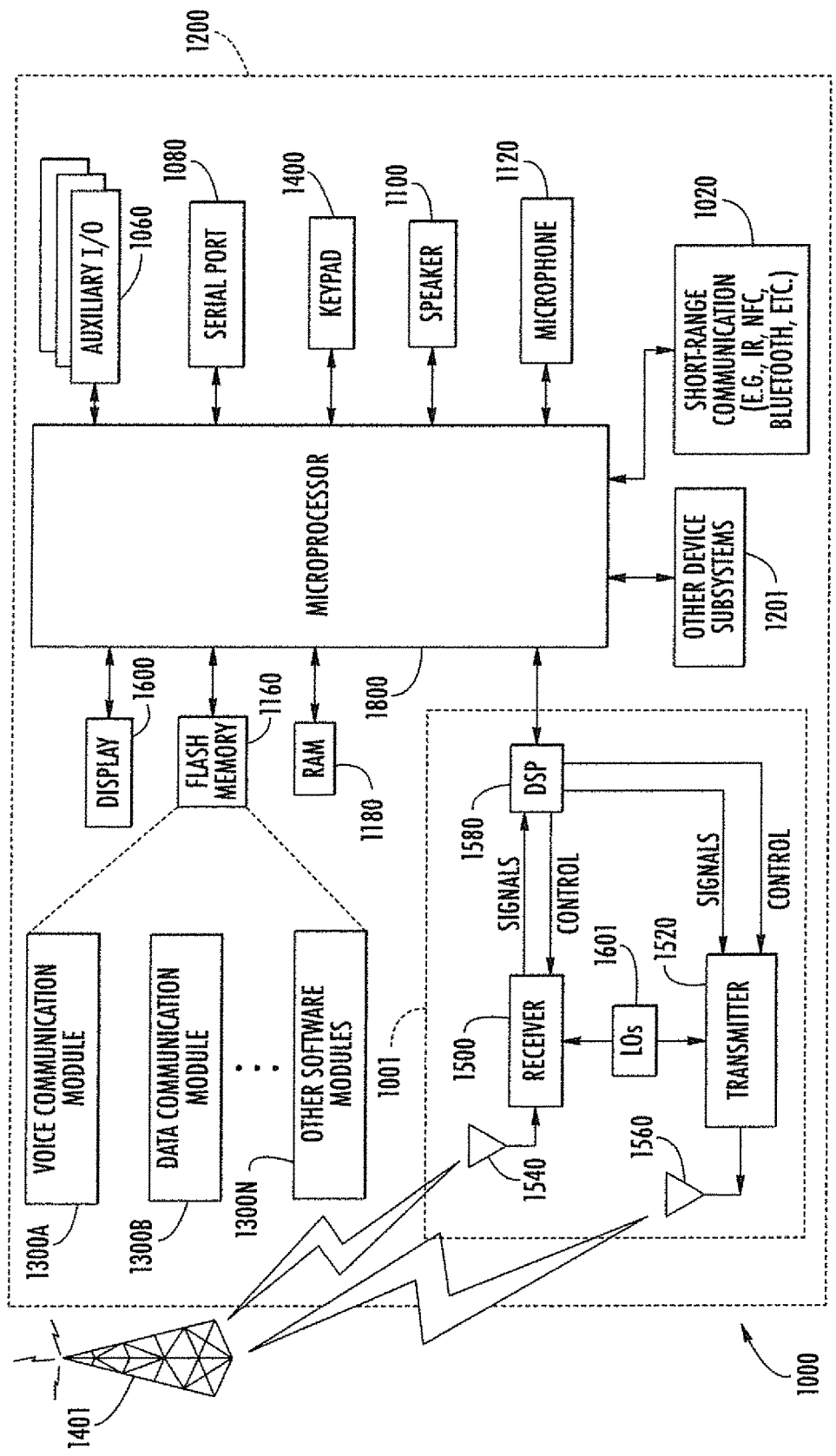
FIG. 6 is a schematic block diagram illustrating example mobile communications device components that may be used with the mobile communications devices shown in FIGS. 1, 4 and 7.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
a memory that stores instructions;
a first near field communication (NFC) device;
a movement determining device; and
a processor coupled with the memory, the first NFC device, and the movement determining device, wherein the processor, responsive to executing the instructions, performs operations comprising:
initiating a first operating mode, wherein, during the first operating mode, the first NFC device is unconditionally enabled for NFC communication;
presenting a display menu for selecting a trigger event for disabling NFC communication in a second operating mode;
receiving a user selection of the triggering event via the display menu;
receiving a request to switch from the first operating mode to the second operating mode;
switching to the second operating mode responsive to the receiving of the request to switch, wherein the first NFC device is conditionally enabled for NFC communication during the second operating mode;
sensing, via the first NFC device, a second NFC device in near proximity during the second operating mode; and
responsive to the sensing of the second NFC device in near proximity during the second operating mode:
detecting the triggering event according to the movement determining device;
if the triggering event is not detected, transmitting a first NFC message to the second NFC device via the first NFC device to facilitate a first transaction; and
if the triggering event is detected, disabling further NFC communication during the second operating mode.

2. The mobile communications device of claim 1 wherein the detecting the triggering event is further according to detecting performance of excessive NFC transactions via the first NFC device.

3. The mobile communications device of claim 1 wherein the detecting the triggering event is further according to detecting expiration of a timer that is initiated responsive to the switching to the second operating mode.

4. The mobile communications device of claim 1 wherein the operations further comprise performing payment transactions via the first NFC device, and wherein the detecting the triggering event is further according to detecting performing excessive payment transactions via the first NFC device.

5. The mobile communications device of claim 1, wherein the operations further comprise:
determining a first location associated with the switching to the second operating mode; and
tracking, via the movement determining device, movement relative to the first location, and wherein the detecting the triggering event is further according to detecting movement exceeding a movement limit.

6. The mobile communications device of claim 1 wherein the movement determining device comprises a wireless communications device, a satellite positioning system device, or any combination thereof.

7. The mobile communications device of claim 6 wherein the wireless communications device comprises a Bluetooth device, a wireless local area network (WLAN) device, or any combination thereof.

8. The mobile communications device of claim 1 wherein the movement determining device comprises an accelerometer.

9. The mobile communications device of claim 1 further comprising an input device coupled with the processor, and wherein the operations further comprise detecting an activation of the input device, wherein the activation is associated with the request to switch from the first operating mode to the second operating mode.

10. A communications system comprising:
a first near field communication (NFC) device; and
a mobile communications device comprising:
a memory that stores instructions;
a second NFC device; and
a processor coupled with the memory and the second NFC device, wherein the processor, responsive to executing the instructions, performs operations comprising:
presenting a display menu at the second NFC device for selecting a trigger event for disabling NFC communication in a second operating mode;
receiving a user selection of the triggering event via the display menu;
receiving a request to switch the second NFC device from a first operating mode, wherein the second NFC device is unconditionally enabled for NFC communication with the first NFC device in the first operating mode, to a second operating mode, wherein the second NFC device is conditionally enabled for NFC communication with the first NFC device in the second operating mode;
switching the second NFC device to the second operating mode responsive to the receiving of the request to switch operating modes;
sensing, via the second NFC device, the first NFC device in near proximity during the second operating mode; and responsive to the sensing of the first NFC device in near proximity during the second operating mode:
  detecting the triggering event according to a movement determining device;
  if the triggering event is not detected, transmitting an NFC message to the first NFC device via the second NFC device to facilitate a transaction; and
  if the triggering event is detected, disabling further NFC communication during the second operating mode.

11. The communications system of claim 10 wherein the detecting the triggering event is further according to detecting performance of excessive NFC transactions via the second NFC device.

12. The communications system of claim 10 wherein the detecting the triggering event is further according to detecting expiration of a timer that is initiated responsive to the switching to the second operating mode.

13. The communications system of claim 10 wherein the transaction comprises a payment transaction with the first NFC device via the second NFC device, and wherein the detecting the triggering event is further according to detecting performance of excessive payment transactions via the second NFC device.

14. A method, comprising:
  presenting, by a processing system comprising a processor, a display menu for selecting a trigger event for disabling near field communication (NFC) in a second operating mode;
  receiving, by the processing system, a user selection of the triggering event via the display menu;
  detecting, by the processing system, a request to switch from a first operating mode, wherein a first NFC device is unconditionally enabled for NFC communication in the first operating mode, to the second operating mode, wherein the first NFC device is conditionally enabled for NFC communication in the second operating mode;
  switching, by the processing system, to the second operating mode responsive to the detecting of the request to switch operating modest;
  sensing, by the processing system, via the first NFC device, a second NFC device in near proximity during the second operating mode; and
  responsive to the sensing of the second NFC device in near proximity during the second operating mode:
    detecting, by the processing system, the triggering event according to a movement determining device;
    if the triggering event is not detected, transmitting, by the processing system, an NFC message to the second NFC device via the first NFC device to facilitate a transaction; and
    if the triggering event is detected, disabling, by the processing system, further NFC communication during the second operating mode.

15. The method of claim 14 wherein the detecting the triggering event is further according to detecting performance of excessive NFC transactions.

16. The method of claim 14 wherein the detecting the triggering event is further according to detecting expiration of a timer that is initiated responsive to the switching to the second operating mode.

17. The method of claim 14 wherein the transaction comprises a payment transaction with the second NFC device via the first NFC device, and wherein the detecting the triggering event is further according to detecting performance of excessive payment transactions.

18. A non-transitory computer-readable medium for a mobile communications device comprising computer-executable instructions that, when executed by a processor, facilitate performance of operations, comprising:
  receiving a user selection of a triggering event for disabling near field communication (NFC) in a second operating mode via a display menu;
  detecting a request to switch from a first operating mode, wherein a first NFC device is unconditionally enabled for NFC communication, to the second operating mode, wherein the first NFC device is conditionally enabled for NFC communication;
  switching to the second operating mode responsive to the detecting of the request to switch operating modes;
  sensing, via the first NFC device, a second NFC device in near proximity during the second operating mode; and
  responsive to the sensing of the second NFC device in near proximity during the second operating mode:
    detecting the triggering event according to a movement determining device;
    if the triggering event is not detected, transmitting an NFC message to the second NFC device via the first NFC device to facilitate a transaction; and
    if the triggering event is detected, disabling further NFC communication during the second operating mode.

19. The non-transitory computer-readable medium of claim 18, wherein the operations further comprise:
  determining a first location associated with the switching to the second operating mode; and
  tracking, via a movement determining device, movement relative to the first location, and wherein the triggering event comprises movement exceeding a movement limit.

20. The non-transitory computer-readable medium of claim 18 wherein the detecting the triggering event is further according to performance of excessive NFC transactions via the first NFC device.

21. The non-transitory computer-readable medium of claim 18 wherein the transaction comprises a payment transaction with the second NFC device via the first NFC device, and wherein the detecting the triggering event is further according to detecting performance of excessive payment transactions via the first NFC device.

* * * * *